June 28, 1938.   C. A. TEA   2,121,893
WEATHER STRIP
Filed March 27, 1936
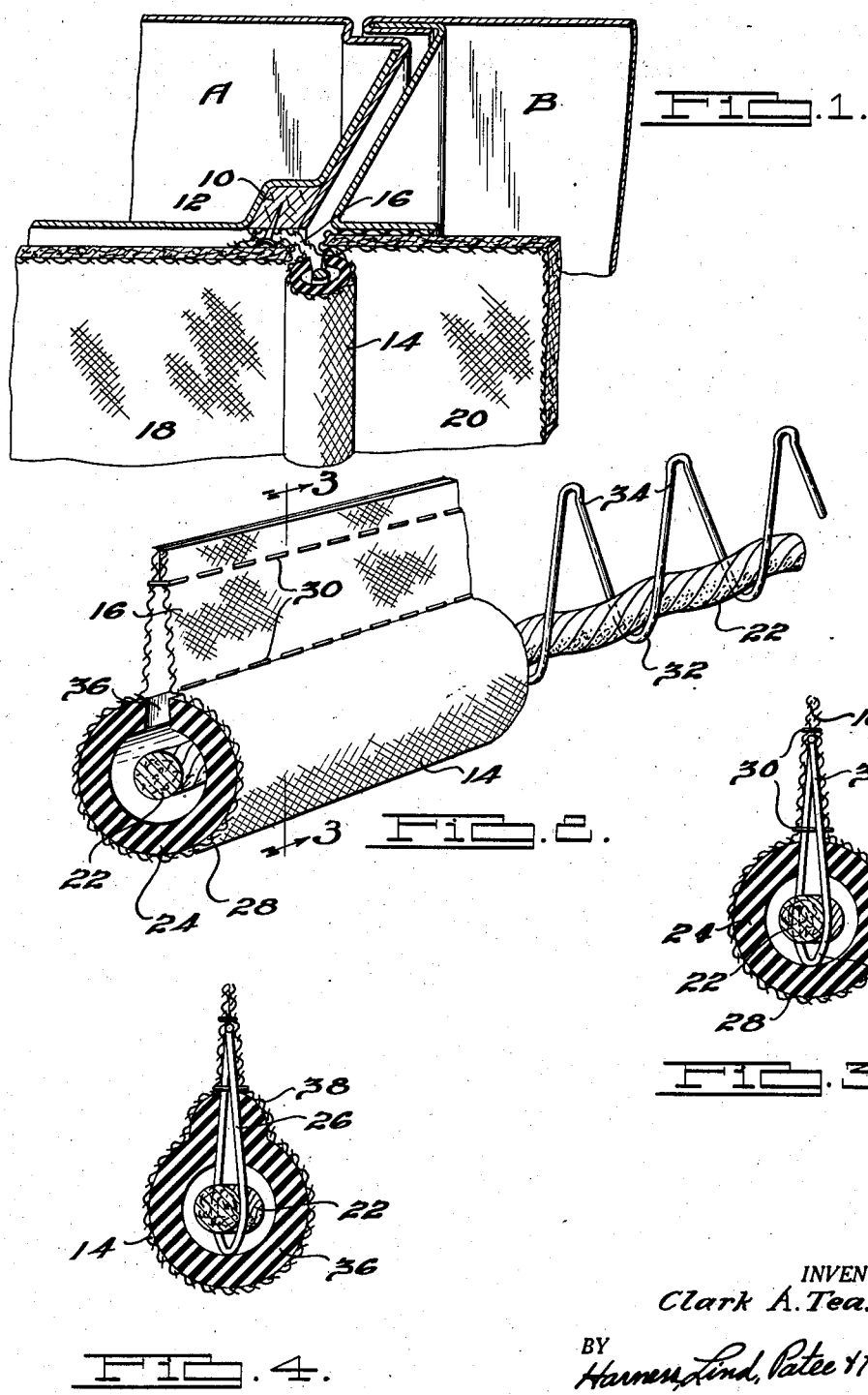
INVENTOR.
Clark A. Tea.
BY
ATTORNEYS.

Patented June 28, 1938

2,121,893

UNITED STATES PATENT OFFICE 2,121,893

WEATHER STRIP

Clark A. Tea, Detroit, Mich., assignor to Chrysler Corporation, Highland Park, Mich., a corporation of Delaware Application March 27, 1936, Serial No. 71,123

11 Claims. (Cl. 20—69)

This invention relates to a weatherstrip and more particularly to a weatherstrip especially adapted for use on motor vehicle bodies to seal the opening around the doors or windows and to the method of making the same.

An object of the invention is to provide a weatherstrip which is strong, inherently resilient, and inexpensive to manufacture.

Another object of the invention is to provide a weatherstrip, the parts of which are easily assembled and retained in assembled position by stitching.

A further object of the invention is to provide a weatherstrip which is free to bend laterally in applying the same to a curved opening.

A further object of the invention is to provide a weatherstrip which has sufficient resiliency to cause it to tightly engage the door or window for sealing purposes and yet adapted to take a permanent set when bent beyond its elastic limit, so that in applying the weatherstrip to an opening it may be bent beyond its elastic limit to conform to any irregularities around the opening, and after being bent to that position possesses sufficient resiliency to flex within given limits.

More specifically stated, the invention consists in applying a resilient wire to the central portion of a cushioning part of the weatherstrip and extending the wire into an attaching portion so that the parts are connected together in such a manner that relative bending movement is resiliently resisted.

Other objects and advantages of the invention will be more fully understood from the following description taken in connection with the accompanying drawing, in which:

Fig. 1 is a perspective view, parts being broken away and in section, of one application of the device as applied to an automobile door opening.

Fig. 2 is a perspective view of the weatherstrip alone, parts thereof being broken away and in section.

Fig. 3 is a cross-sectional view taken on line III—III of Fig. 2.

Fig. 4 is a cross-sectional view corresponding to Fig. 3 but showing a modification of the weatherstrip.

Referring to the drawing, I have illustrated a portion of the automobile body frame at A and a door at B. The frame is provided with a tacking insert 10 to which the weatherstrip is secured such as by tacks 12.

The weatherstrip comprises a cushioning member 14 and an attached flanged tacking strip 16, the latter being secured to the tacking insert 10.

As illustrated, a panel member 18 is secured to the frame A overlapping the flanged tacking strip 16. The inner panel of the door is shown at 20.

Referring now to Figs. 2 and 3, the weatherstrip is provided with a core 22, preferably in the form of a cord, usually made from paper, or the like, about which is loosely positioned a tubular cover 24, preferably made of a soft material such as rubber. The tubular cover is split longitudinally as at 26 to permit the insertion of the core 22. Surrounding the cover 24 I have provided a fabric covering 28, the free edges of which are stitched as at 30, forming the attaching portion 16 and securing the parts together in a unitary structure.

Heretofore, the parts thus far described have been extensively used but they have not fully answered the purpose for which they have been intended because they do not possess sufficient resiliency or rigidity to firmly hold the cushioning portion 14 tightly against the movable part of the door or window opening.

In order to give the parts more rigidity and at the same time provide sufficient flexibility, I have preformed a wire into loops so that it may have a portion coiled about the core 22 and another portion extending laterally into the attaching portion 16. It is important to select a wire having a deflection characteristic which, when bent within limits, is elastic but when bent beyond its limits takes a base set and is elastic from that bent position. This is important when the weatherstrip is applied to an irregular surface. For example, the strip may be manually bent beyond its elastic limit to fit an irregular surface but when so bent it is elastic from that bent position. I have found that a wire suitable for this purpose should have an elastic limit between 250,000 lbs. per square inch and 350,000 lbs. per square inch and may be formed from what is commonly termed music wire having a diameter of approximately one sixty-fourth of an inch.

As shown in Figs. 2 and 3 the wire is looped as at 32 and formed zigzag, having laterally extended portions 34 which approach a flattened condition at the side opposite the loops 32. The core 22 is laced through the loops 32 and may be of any length. As these two parts are assembled, the cover 24 is placed over the loops 32 and core 22, with the flattened portions 34 extending through the longitudinal split 26, after which the fabric is applied and stitched along the laterally extending portions 34 of the wire.

By forming the wire into zigzag shape it is readily possible to bend the weatherstrip in any direction such as is required in securing the strip to a curved surface or in going around a corner of the door opening or the like.

In Fig. 4 I have shown a modification of the device in which the tubular cover 36 is provided at its side adjacent the slit 26 with a slightly elongated portion 38 which gives a general oval cross-sectional shape to the cover, thereby permitting easier bending of the cushion portion 14. In the form shown in Fig. 4, when the cushion member is applied to the edge of the opening, the tubular portion 36 rolls back against the wall more readily than the tubular portion 24 shown in Figs. 2 and 3 because in the latter form the tubular portion strikes the wall too quickly, whereas in Fig. 4 the tubular portion does not strike the wall as quickly and rolls on the extended portion 38 rather than the tubular portion 24 or 36.

Although but several specific embodiments of the invention have herein been shown and described, it will be understood that various changes in the size, shape and arrangement of parts may be made without departing from the spirit of my invention.

What is claimed is:

1. A weatherstrip comprising a flexible core of considerable length, a resilient wire having portions encircling and compressing said core alternating with laterally extending loops all of which are on the same side of said core, and a slitted tubular cover in which said core is arranged with said loops projecting through the slitted side.

2. A weatherstrip comprising a flexible core of considerable length, a resilient wire having portions encircling and compressing said core alternating with laterally extending loops all of which are on the same side of said core, a slitted tubular cover in which said core is arranged with said loops projecting through the slitted side, and a cover over said core and said laterally extending loops.

3. A weatherstrip comprising an elongated core of yielding material, a strip of flexible pliable material having a tubular enclosing portion surrounding said core, and a resilient looped wire member arranged within said weatherstrip and projecting through and beyond said tubular portion to form an attaching portion.

4. A weatherstrip comprising an elongated core of yieldable material, a resilient wire looped tightly around said core having laterally extending portions between and connecting adjacent loops of said wire forming an attaching portion, a tubular member of yieldable material loosely surrounding said core.

5. A weatherstrip core of considerable length having a resilient wire formed with portions encircling and compressing said core alternating with laterally extending loops all of which are on the same side of said core.

6. A weatherstrip comprising an elongated core of yielding material, a wire having an elastic limit over 250,000 pounds per square inch looped around said core and having laterally extending portions forming an attaching portion, a tubular member of yieldable material loosely surrounding said core, and a fabric covering over said tubular member.

7. A weatherstrip comprising an elongated core of yielding material, a wire having an elastic limit not over 400,000 pounds per square inch looped around said core and having laterally extending portions forming an attaching portion, a tubular member of yieldable material loosely surrounding said core, and a fabric covering over said tubular member.

8. A weatherstrip comprising an elongated core of yielding material, a strip of pliable material loosely surrounding said core and a resilient looped wire member around said core projecting through and beyond the outer surface of said pliable material, the outer periphery of said pliable material being substantially oval.

9. A weatherstrip comprising a wire wound into a flat sinuous formation, a strip of pliable material wound sinuously through the convolutions of said wire and disposed adjacent a common set of ends of said convolutions, a tubular sheath of pliable material enclosing said pliable strip and the adjacent ends of the convolutions of the wire and having the opposite ends of the convolutions projecting therefrom, and a cover member holding the several parts in proper assembled relationship.

10. A weatherstrip comprising a wire wound into a flat sinuous formation, a strip of pliable material wound sinuously through the convolutions of said wire and disposed adjacent a common set of ends of said convolutions, a tubular sheath of pliable material enclosing said pliable strip and the adjacent ends of the convolutions of the wire and having the opposite ends of the convolutions projecting therefrom, and a cover member holding the several parts in proper assembled relationship, said wire having an elastic limit between 250,000 and 350,000 pounds per square inch and being of such cross-section as to be readily bent beyond its elastic limit manually.

11. A weatherstrip comprising a wire wound into a flat sinuous formation, a strip of pliable material wound sinuously through the convolutions of said wire and disposed adjacent a common set of ends of said convolutions, a tubular sheath of pliable material enclosing said pliable strip and the adjacent ends of the convolutions of the wire and having the opposite ends of the convolutions projecting therefrom, and a cover member holding the several parts in proper assembled relationship, said wire being of such composition that it is flexible with respect to any basic set and deformable to any new basic set by deflection beyond its elastic limit.

CLARK A. TEA.